Dec. 20, 1927.
H. YEAGER
ADJUSTABLE END THRUST BEARING
Filed Nov. 10, 1926
1,653,528
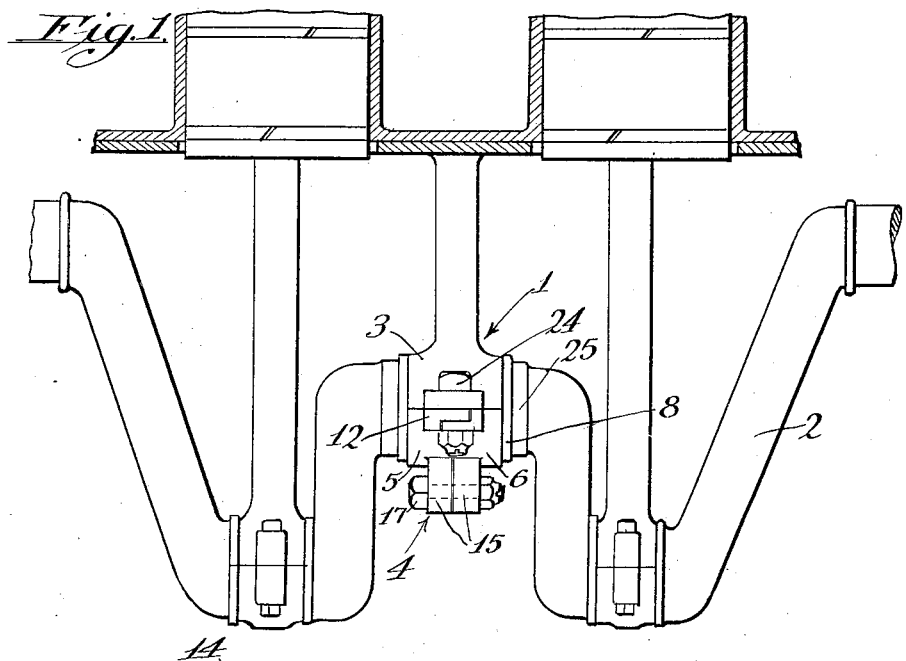
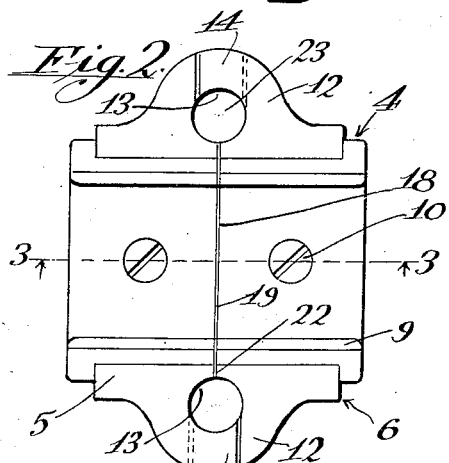
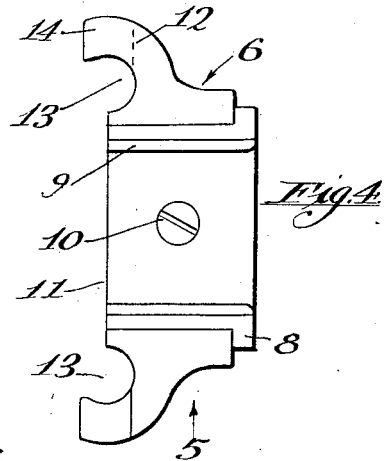
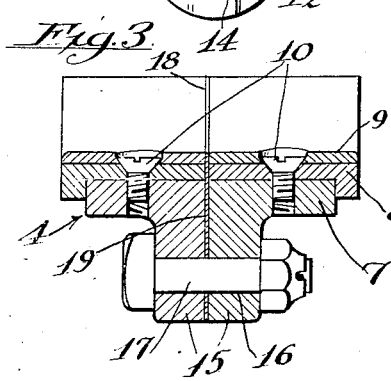
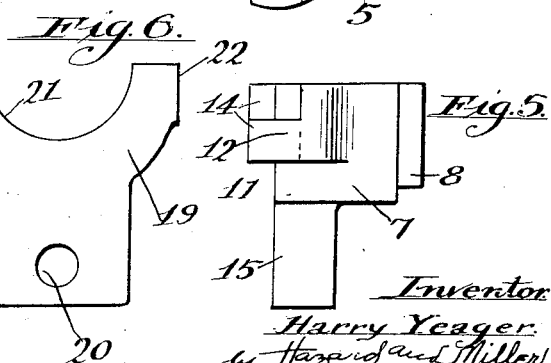
Inventor
Harry Yeager.
by Hazard and Miller
Attorneys Patented Dec. 20, 1927.

1,653,528

UNITED STATES PATENT OFFICE.

HARRY YEAGER, OF LOS ANGELES, CALIFORNIA.

ADJUSTABLE END-THRUST BEARING.

Application filed November 10, 1926. Serial No. 147,440.

My invention is an adjustable end thrust bearing particularly adapted for a crank shaft bearing and also applicable to a connecting rod bearing to a crank shaft. It is to be understood that the bearing however applies to any type of shaft which is subject to slight longitudinal movement in order to prevent such movement.

An object of my invention is the construction of one of the caps or halves of a bearing to allow same to take up end thrust or to fit the bearing surface of a crank or shaft to prevent longitudinal play.

A more particular object of my invention is to form a half or segment of a bearing with a transverse split in which one or more shims may be inserted to spread the bearing lengthwise of the shaft and thereby take up end thrust.

My invention is more readily understood from the following description in connection with the drawings, in which:

Figure 1 is a side elevation of a crank shaft showing my bearings used in the crank shaft bearing.

Figure 2 is a plan view with the bearing block removed.

Figure 3 is a longitudinal section of the bearing block on the line 3—3 of Fig. 2, taken in the direction of the arrows.

Figure 4 is a plan view of one of the halves of the bearing block.

Figure 5 is a side elevation of Fig. 4, taken in the direction of the arrow 5.

Figure 6 is a face view of a shim for insertion between the halves of the bearing.

In Fig. 1 I show a main bearing 1 for a crank shaft 2. This bearing has a fixed upper part 3, which is rigidly connected to the structure of the engine, and having the removable lower half bearing designated generally by the numeral 4. It is in this lower half that the features of my invention are centered.

The lower bearing section is formed of two parts 5 and 6 each of which has a backing part 7 in which the wearing bushing 8 is secured, this wearing bushing preferably having a coating 9 of bearing metal such as babbitt or the like, the bushing being held in the backing by screws 10 or other equivalent construction.

Each half of the bearing has a flat face 11, these faces of each half being contiguous one to the other when assembled, and the backing parts 7 are provided with lugs 12 on opposite sides. These lugs have a partly circular recess 13, the ends 14 of the lugs projecting past the surface 11 so that these are over-lapped, as indicated in Fig. 2. Each of the backing members has a flange 15 extending radially outwardly from the main portion of the backing member, there being a bolt hole 16 therethrough, in which the bolt 17 is inserted to clamp the two parts of the bearings together in a longitudinal direction.

The bearing thus formed in effect is a half bearing with a transverse split 18 and when it is desired to take up end thrust the bolt 17 may be loosened and disconnected and one or more shims 19 inserted in the split portion of the bearing between the flat surfaces 11. This shim has a bolt hole 20 for the bolt 17 to fit through, and has a semi-circular curved part 21 which is of greater radius than the wearing surface of the bushing so that it will not come in contact with the shaft, the side edges 22 extend substantially to the bolt hole 23 formed by the recess 13 when the two halves of the bearing are fitted and matched together. The upper and lower bearing sections are bolted together in the usual way by bolts 24 which fit through the bolt holes 23, formed as above mentioned by the over-lapping lugs 12 of the two halves of the lower bearing section and through the upper half 3 of the bearing.

From the above description it will be seen that I have developed a simple type of adjustable end thrust bearing which takes up the end thrust between the collars 25 of a crank or the like, although the upper fixed part 3 of the bearing cannot be spread lengthwise on account of the lower half being extendable by means of shims, this will take up any play between the collars. It is obvious that my invention may be applied to connecting rod bearings where these run between collars on a crank, or to the other types of bearings in which the bearing fits between collars on a rotatable shaft.

Various changes may be made in the principles of my invention without departing from the spirit thereof, as set forth in the description, drawings and claims.

I claim:

1. In an adjustable end thrust bearing, a half bearing formed in two substantially similar parts with a transverse joint, each of the parts having lugs with partly circular recesses, the lugs of one part over-lapping the lugs of the other part, and a bolt to secure the said sections together.

2. In an adjustable end thrust bearing, a part bearing having backing parts formed in two substantially similar sections with a transverse joint, each of said sections having a plurality of lugs with a partly circular recess for each lug, the lugs of each section over-lapping and forming substantially circular bolt holes, a flange extending outwardly from each of the backing parts and having a longitudinal bolt hole and a bolt secured therein to attach said parts together.

3. In an adjustable end thrust bearing a part bearing having two substantially similar parts, each having a backing part with a flange secured thereto extending radially from the axial center of the part bearing, said flanges being positioned to abut against each other or to be separated by a shim, each flange having a bolt hole, said bolt holes being aligned and a bolt extending therethrough, each of the bearing parts having lateral lugs on opposite sides at substantially one-fourth of a circle on opposite sides of the said flange, each lug having a partly circular recess, the lugs of each section overlapping forming substantially circular bolt holes.

4. In an adjustable end thrust bearing a part bearing having two backing parts substantially similar, each backing part having a flange extending radially from the axial line of the part bearing, said flanges being adapted to abut or to engage a shim placed between same, a bolt through the flanges securing the two parts together, lateral lugs having partly circular recesses, said lugs overlapping and forming substantially circular bolt holes, and a bushing secured in each of the bearing parts.

In testimony whereof I have signed my name to this specification.

HARRY YEAGER.